United States Patent [19]

Fryer, Jr. et al.

[11] 3,832,790
[45] Sept. 3, 1974

[54] PROGRAMMABLE TRAINER

[75] Inventors: George L. Fryer, Jr.; Herman B. Gibson, Jr., both of Orlando, Fla.

[73] Assignee: EDP-ECC Corporation, Washington, D.C.

[22] Filed: Sept. 29, 1972

[21] Appl. No.: 293,434

[52] U.S. Cl.............................. 35/8 R, 35/9 A, 35/10, 35/13, 35/48 R
[51] Int. Cl. ............................................. G09b 9/00
[58] Field of Search.............. 35/8 R, 8 A, 9 R, 9 A, 35/9 B, 10, 13, 19 A, 48 R

[56] References Cited
UNITED STATES PATENTS

| | | | |
|---|---|---|---|
| 3,363,333 | 1/1968 | Alexander............................ | 35/19 A |
| 3,414,985 | 12/1968 | Ashley .................................... | 35/8 R |
| 3,570,146 | 3/1971 | Golden............................... | 35/9 R X |
| 3,597,855 | 8/1971 | Stejskal et al.......................... | 35/9 A |
| 3,604,128 | 9/1971 | Homann ................................ | 35/13 |
| 3,623,157 | 11/1971 | Stapleford.......................... | 35/9 A X |
| 3,693,268 | 9/1972 | Thompson ........................... | 35/48 R |

*Primary Examiner*—Robert W. Michell
*Assistant Examiner*—Vance Y. Hum

[57] ABSTRACT

A universal teaching machine which may be caused to function as a special purpose training system is disclosed. Simulation of a selected specialized lesson subject is accomplished by means of a set of randomly selectable pictures and a student display-reaction panel. The machine includes a stored program processor which operates under control of a pre-recorded program model commensurate with the student panel; the program model being loaded into the memory of the processor and cooperating with student operable actuators and display devices on the panel to program the machine to function as a special purpose training system.

6 Claims, 13 Drawing Figures

PATENTED SEP 3 1974            3,832,790

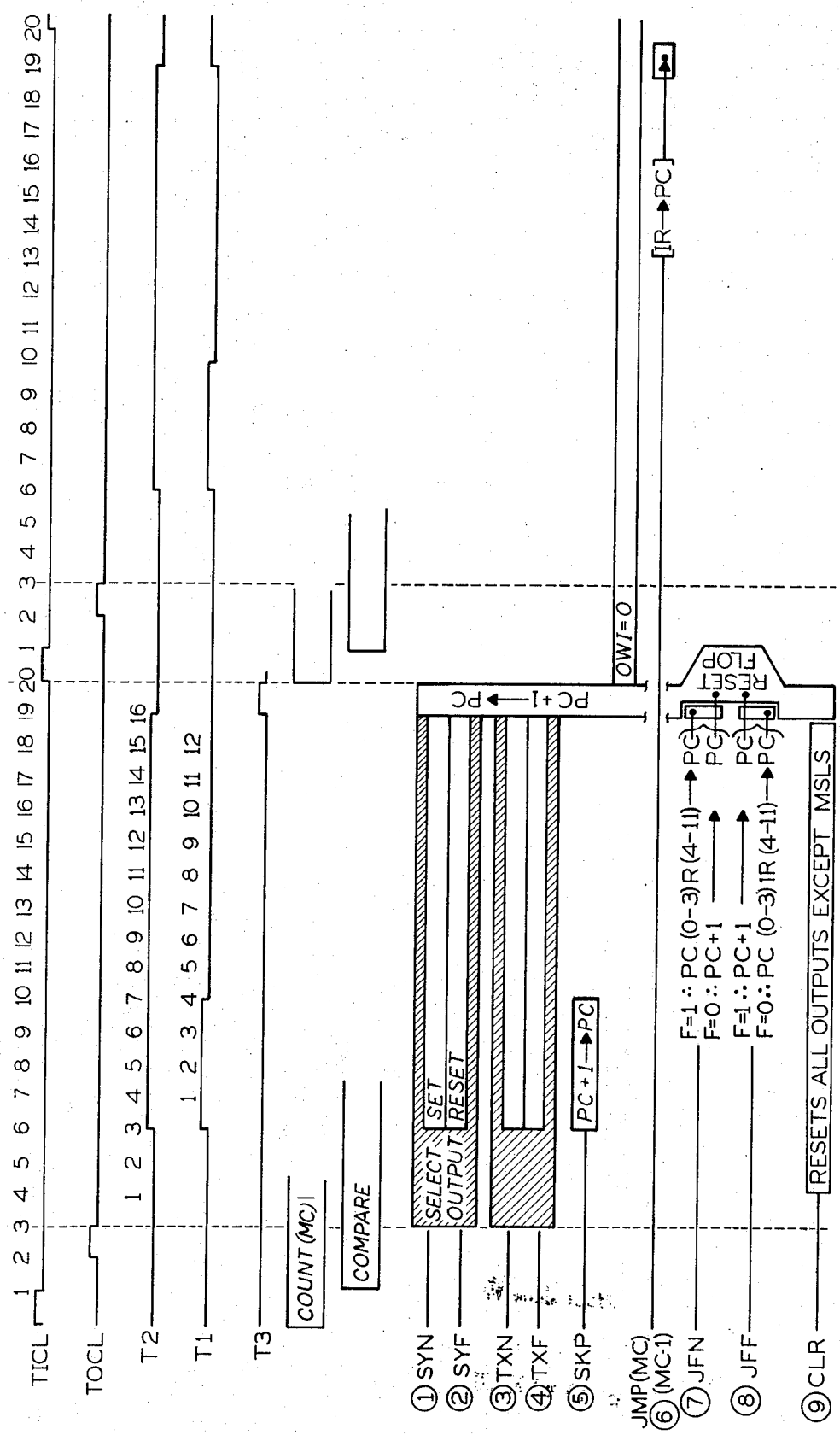

FIG. 6

ADDRESS ASSIGNMENT CHART

| PS\ADD | | | | 8 | 0 | 1 | 0 | 1 | 0 | 1 | 0 | 1 | 0 | 1 | 0 | 1 | 0 | 1 | 0 | 1 | | | |
|---|---|---|---|---|---|---|---|---|---|---|---|---|---|---|---|---|---|---|---|---|---|---|---|
| | | | | 6 | 0 | 0 | 1 | 1 | 0 | 0 | 1 | 1 | 0 | 0 | 1 | 1 | 0 | 0 | 1 | 1 | | ADD 1 | |
| | | | | 10 | 0 | 0 | 0 | 0 | 1 | 1 | 1 | 1 | 0 | 0 | 0 | 0 | 1 | 1 | 1 | 1 | | ADD 2 | |
| 3 | 4 | 5 | 6 | 11 | 0 | 0 | 0 | 0 | 0 | 0 | 0 | 0 | 1 | 1 | 1 | 1 | 1 | 1 | 1 | 1 | | ADD 4 | |
| | | | | | | | | | | | | | | | | | | | | | | ADD 8 | |
| 0 | 0 | 0 | 0 | | 0 | 1 | 2 | 3 | 4 | 5 | 6 | 7 | 10 11 12 13 14 15 16 17 | | | | | | | | 20 21 22 23 24 25 26 27 | 30 31 32 33 34 35 36 37 | |
| 0 | 0 | 0 | 1 | | | | | 40 STUDENT PANEL LAMPS & SWITCHES | | | | | | | | | | | | | | | |
| 0 | 0 | 1 | 0 | | | | | | | | | 50 MALF REG. 0 57 | | | | 150 MALF REG. 8 157 | | | | | 70 16 MALF REG. 77 | |
| 0 | 0 | 1 | 1 | | | | | 140 | | | | | | | | | | | | | | | |
| 0 | 1 | 0 | 0 | | | | | 200 5 AMP DRIVERS | | | | | | | | | | | | | | | |
| 0 | 1 | 0 | 1 | | | | | | | | | | | | | 170 24 | | | | | 170 171 172 173 174 175 176 177 | |
| 0 | 1 | 1 | 0 | | | | | 300 (X) PROJECTOR | | | | | | | | | | | | | | | |
| 0 | 1 | 1 | 1 | | | | | 340 (Y) | | | | MEMORY STATE LATCHES (FOUR PAGES) | | | | | | | | | | 277 |
| | | | | | | | | | | | | | 311 LSB METER MSB 351 352 353 354 355 356 357 | | | | 360 361 362 363 364 365 366 367 | | | | | | |
| | | | | | QAD 0 | | | | | | | QAD 1 | | | | | QAD 2 | | | | | QAD 3 | |

1 = ON
0 = OFF

TEST & CONTROL BIT

| | OUT | | IN | |
|---|---|---|---|---|
| | P1 MSL (PAGE ADDRESS) | | P1 | DELAY |
| | P0 | | P0 | FLASH (2 Hz) |
| 174 | DELAY INITIATE | | | PROJECTOR DONE |
| 175 | ENABLE TEST TIMER | | | |
| 176 | TEST CTR. INCREMENT | | | |
| 177 | REPLACE CTR. INCREMENT | | | |
| 352 | STUDENT LAMP ENABLE | | | |
| 353 | METER PEG | | | |
| 354 | SONALERT | | | |

| | OUT | |
|---|---|---|
| 355 | 1 | |
| 356 | 2 | |
| 357 | 3 | |
| 360 | 4 | |
| 361 | 5 | METER PROBE ENABLE |
| 362 | 6 | |
| 363 | 7 | |
| 364 | 8 | |
| 365 | 9 | |
| 366 | 10 | |
| 367 | 11 | |

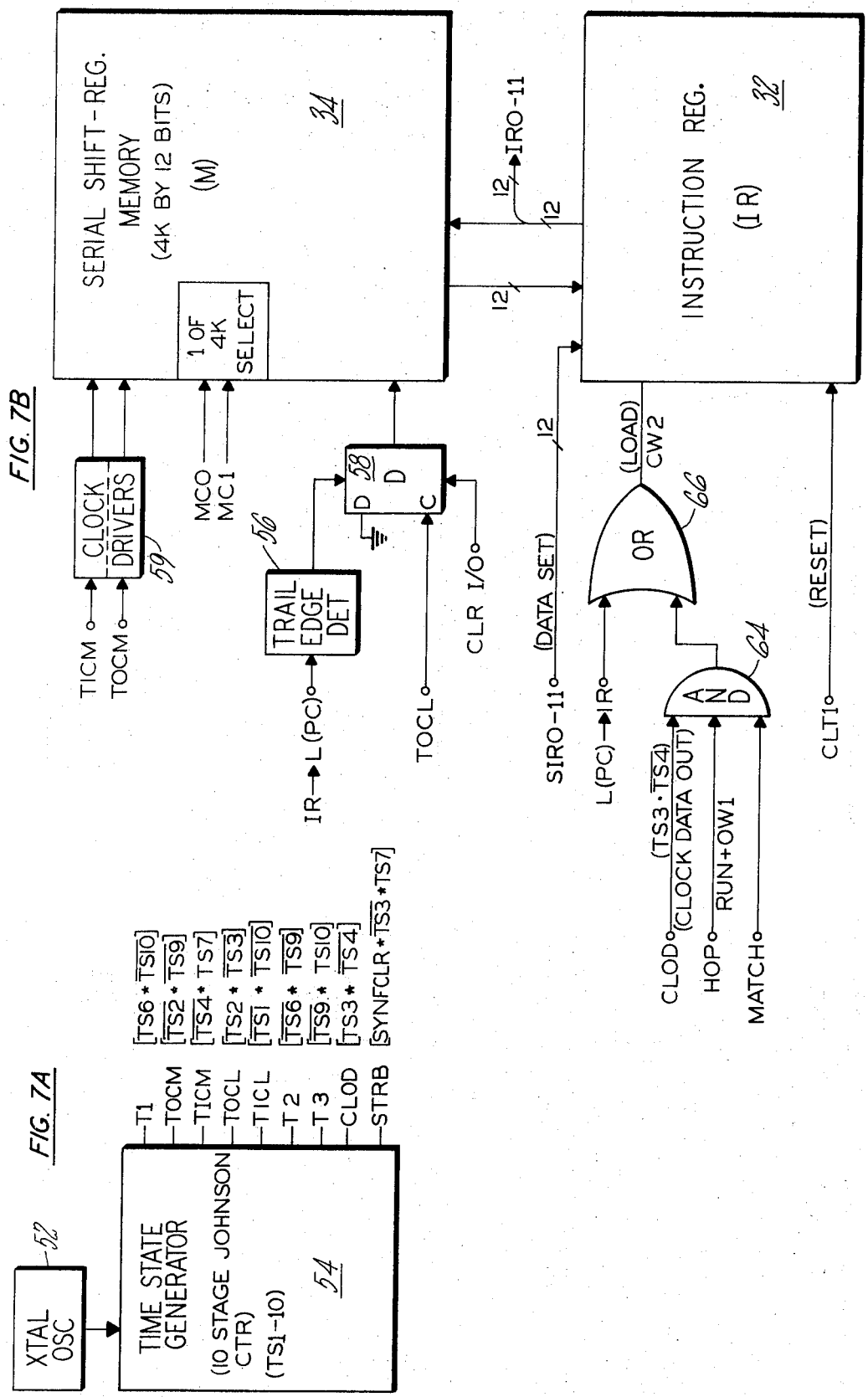

FIG. 7F
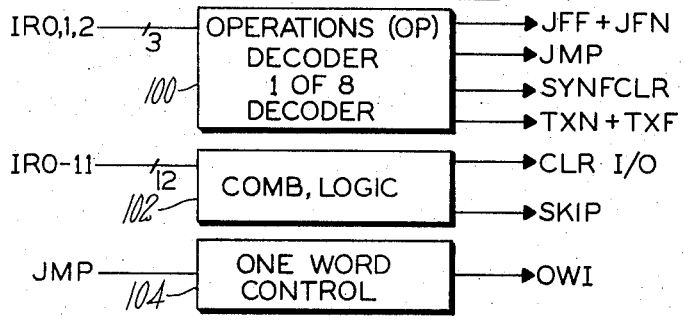
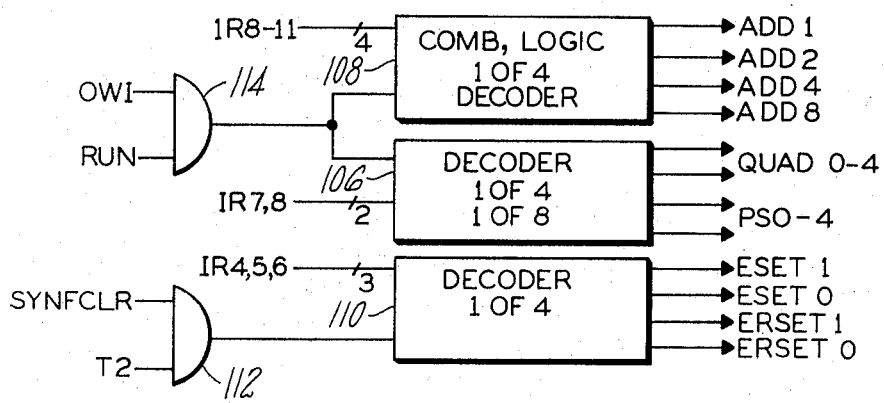
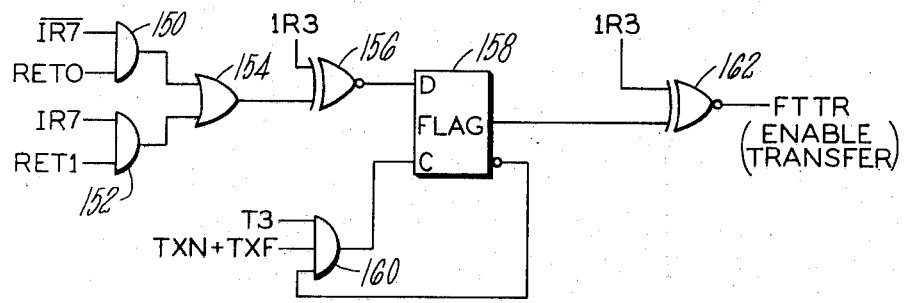
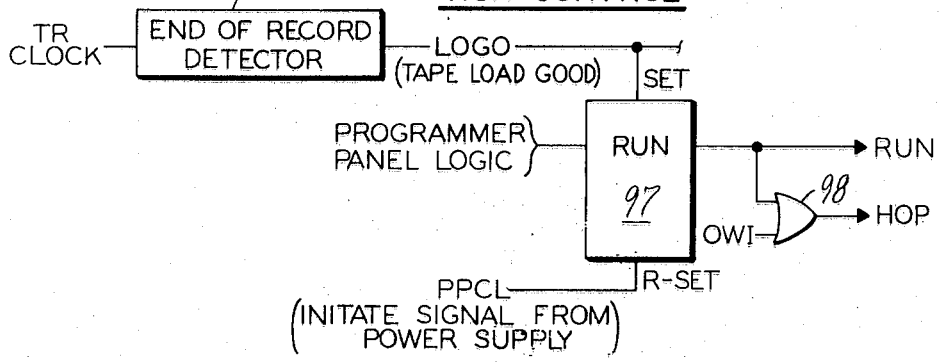

FIG. 8
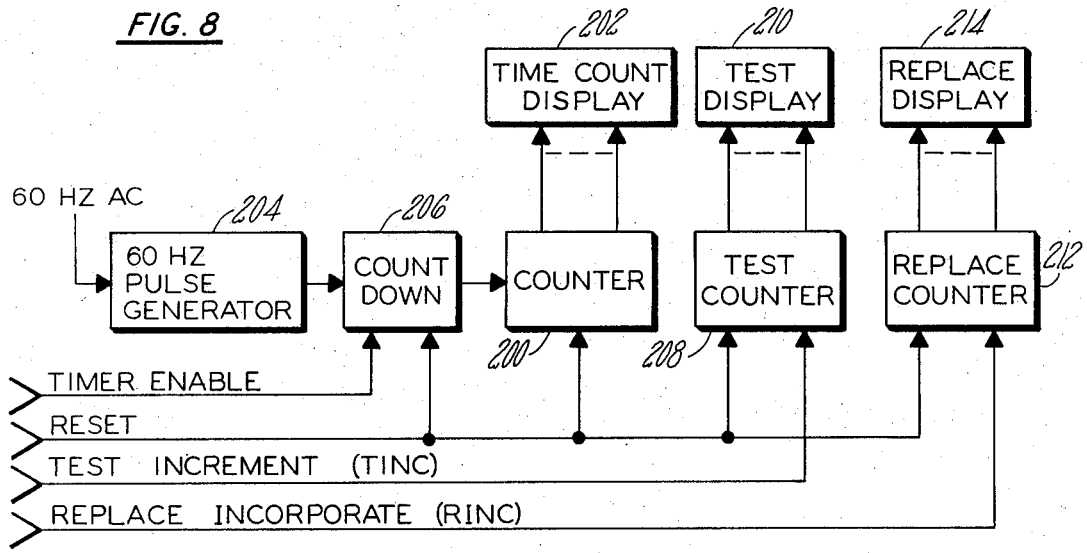
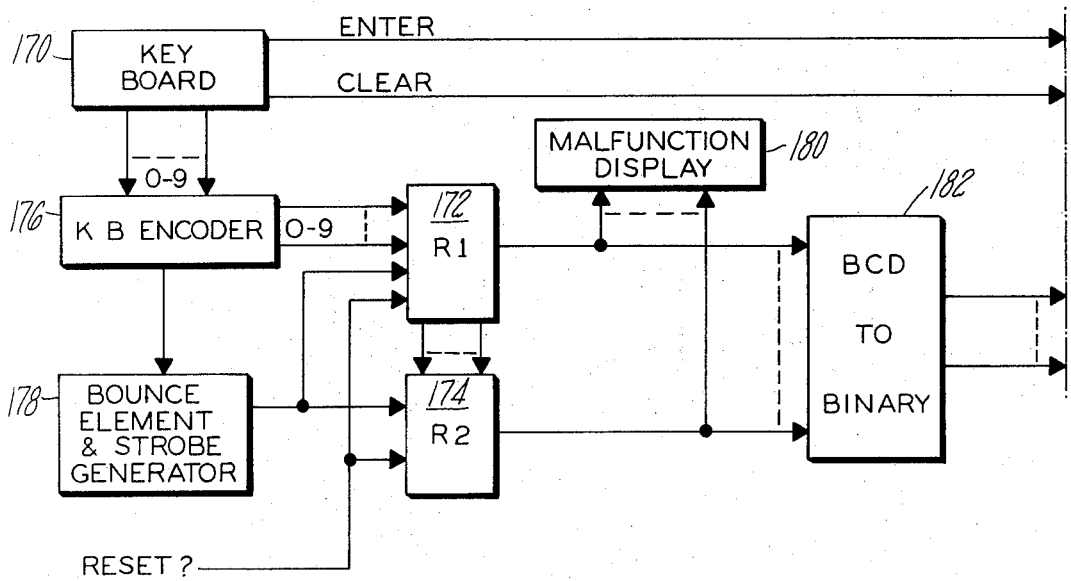
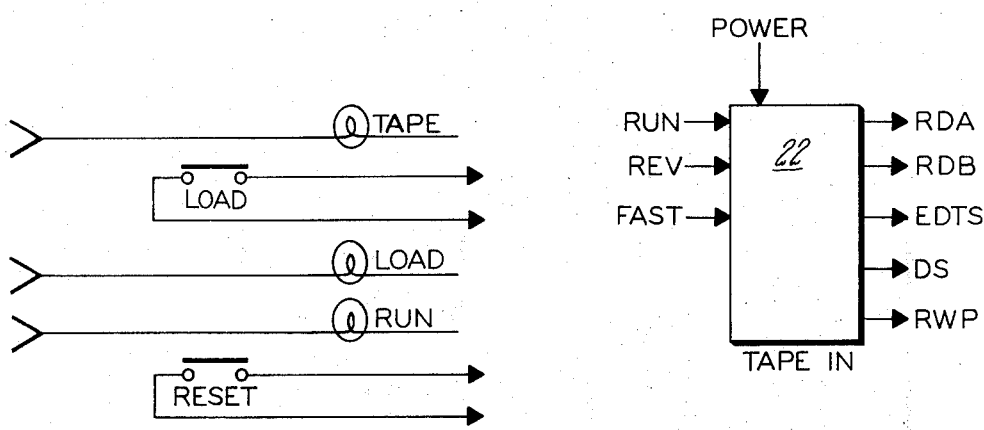

PROGRAMMABLE TRAINER

BACKGROUND OF THE INVENTION:

1. Field of the Invention

The present invention relates to the field of education. More specifically, this invention is directed to training devices which present problems to students by means of a visual display and which demand active responses from the student. Accordingly, the general objects of the present invention are to provide novel and improved methods and apparatus of such character.

2. Description of the Prior Art

Trainers of the general type with which the present invention is concerned are disclosed in U.S. Pat. Nos. 3,310,883, issued Mar. 28, 1967 to G. H. Young, and 3,604,128, issued Sept. 14, 1971 to A. J. Homann. Briefly, trainers or teaching machines such as those disclosed in the Young and Homann patents present problems to students in the form of visual (graphic) displays. Such displays may be in the form of a projected image and/or a template carrying a pictorial presentation and having indicator lamps associated therewith. The prior art trainers also provided the student with a plurality of manually actuable devices, typically push button type switches, whereby the student would make an active response to the visual display. When the student makes the correct response, at least part of the presentation will change thereby providing an immediate indication as to whether or not the student's reaction was correct.

In an effort to provide flexibility and thus enhance the potential utility of the prior art trainers, the devices could be programmed and the displays to be presented to the student changed. The prior art teaching machines could not, however, be properly classified as universal trainers since programming was accomplished by a prewired "program". Thus, each program was a laboriously constructed and expensive hardware item. In addition, as may most clearly be seen from the above-mentioned Homann patent, the flexibility of prior art trainers was limited by the fact that the graphic display was mated to an array of actuator-indicator switches on a console. The restraints imposed by the necessity of matching the visual display to the console switch array substantially increased the cost of each teaching system.

SUMMARY OF THE INVENTION:

The present invention comprises an improvement over prior art trainers as exemplified by U.S. Pat. Nos. 3,310,883 and 3,604,128 in that it is a truly universal trainer that may be configured as a special purpose training system by providing a program model of the system desired. In achieving this general object, the present invention employs a stored program processor which operates under the control of a "program model". The processor or computer includes a memory and the stored program model may be read into the memory from a magnetic tape. The program model, in conjunction with switches and display devices integral with a specialized student display panel, serve to program the trainer to simulate the system desired and thereby enable a student to observe the operation of the specialized system.

In addition to the stored program processor and display panel having integral actuator switches and indicia providing means, the trainer of the present invention has the capability of being programmed from an instructor keyboard whereby abnormalities in the specialized system which is the object of the instruction program may be entered by the instructor. These "malfunctions" will cause the display devices in the student panel and the switches to behave in such a way as to simulate the system that has been programmed. As additional outputs, the trainer has a projector and associated screen, a meter movement and a plurality of counters. The projector is loaded with a plurality of pictures which, under control of the program processor, can be individually selected and shown on a screen to reinforce the simulation provided by the student panel. Similarly, by varying the meter face and controlling the meter drive current via the processor, additional realism is imparted.

The present invention is characterized by a novel digital computer which functions as the above-noted program processor. This computer has the ability of processing boolean algebra equations while being of small size and modest cost. In accomplishing the foregoing the computer in accordance with a preferred embodiment of the present invention employs a primary serial shift register memory. An input-output instruction register is associated with the computer data storage device. The instruction register performs the functions of memory and input-output register and permits elimination of the operations code and address registers of the prior art.

BRIEF DESCRIPTION OF THE DRAWING:

The present invention may be better understood and its numerous objects and advantages will become apparent to those skilled in the art by reference to the accompanying drawing wherein like reference numerals refer to like elements in the various figures and in which:

FIG. 5 is a command sequence chart for the computer which comprises the preferred embodiment of the invention;

FIG. 6 is an address assignment chart for the computer of the FIG. 1 embodiment;

FIG. 7A is a block diagram of the timing signal generator of the computer of the FIG. 1 embodiment;

FIG. 7B is a block diagram of a portion of the logic circuitry of a computer in accordance with the invention;

FIG. 7F is a block diagram depicting the operations and address decoders and the flag flop circuit of the computer of FIG. 1; and FIG. 8 is a block diagram of the instructors panel of the FIG. 1 embodiment.

Figure 1:
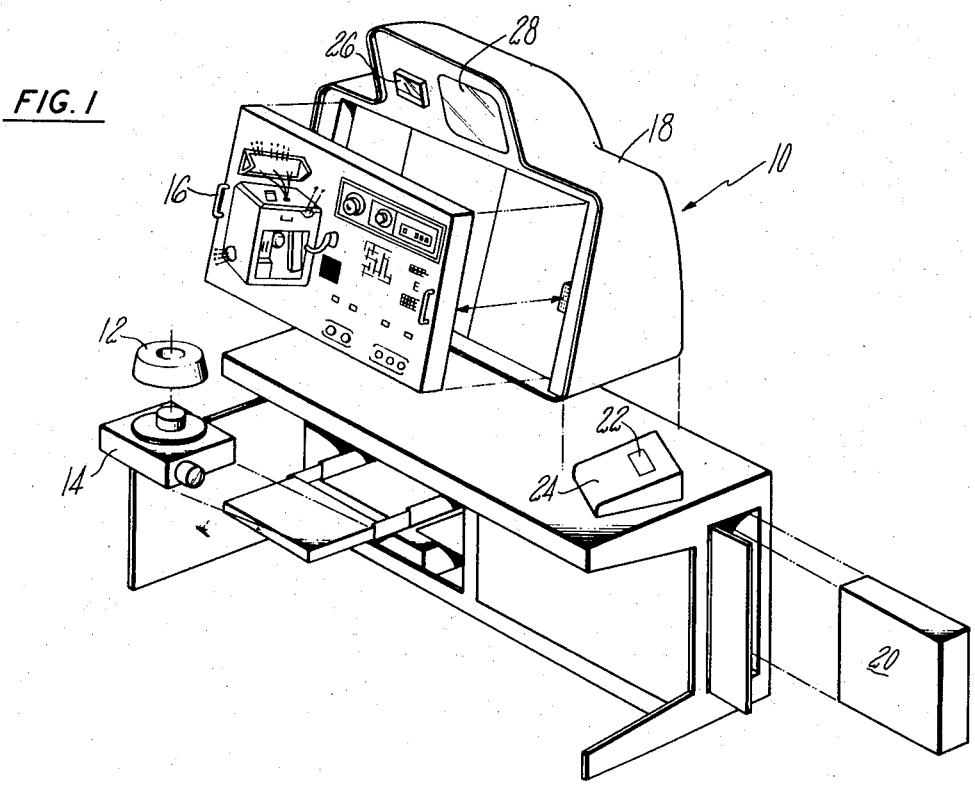
FIG. 1 is an exploded, perspective view of a preferred embodiment of a trainer in accordance with the present invention.

DESCRIPTION OF THE PREFERRED EMBODIMENT:

As noted above, apparatus in accordance with the present invention is a universal trainer that may function as a special purpose training system by providing the apparatus with a program model of a system to be simulated. The system to be simulated may, by way of example, be commensurate with an appliance or other piece of mechanical or electrical equipment or with a more conventional academic study course. A preferred embodiment of a trainer in accordance with the present invention is indicated generally at 10 in FIG. 1. In order to configure trainer 10 as a special purpose training system, a set of pictures associated with the system to be simulated and a specialized display panel commensurate with the system are inserted in the trainer. In the disclosed embodiment the pictures are inserted in the form of a slide tray 12, which may contain up to 100 transparencies in a preferred embodiment, loaded in a projector 14 which comprises part of the trainer. The specialized panel 16 is received on the front of a student display console subassembly 18. The specialized panel 16 contains lamps and student operable switches projecting through a front face; the front face schematically or pictorially illustrating the system to be simulated with the switches and lamps being appropriately located. If desired, display panel 16 may include active as well as static indicia energized in the manner to be described below. Internal wiring in the student panel provides, via a plurality of mating connectors on panel 16 and console 18, electrical connection between the switches and lamps of panel 16 and the control logic portions of the trainer.

A particularly unique feature of trainer 10 is the incorporation, within the functional elements of the trainer, of a stored program processor. The processor, as will be described in greater detail below, includes a digital computer 20 which operates under control of a program model. A separate program model is loaded into the memory of computer 20 commensurate with each system to be simulated via a magnetic tape reader 22 located on the instructor's control panel 24. This program model works in conjunction with the lamps and switches on the specialized student panel 16 to enable a student to observe the operation of his specialized system. The trainer also has the capability of simulating abnormalities, for example malfunctions in the case of an appliance simulation, which may be called for from a keyboard on the instructor's panel 24. These malfunctions may be entered and removed instantaneously to depict a normal and abnormal system "side-by-side" and are utilized by the programmer or system analyzer in such a manner as to cause the student panel lamps and switches, as well as the slides stored in projector 14, to simulate abnormalities in the programmed system. The information contained on the slides may be presented to the student via a projection system as shown schematically in FIG. 2; the slides in tray 12 being shown on a screen 28 by projector 14.

Trainer 10 has, in addition to the lamps on the student panel 16 and the individual selected slides in tray 12, an additional output in the form of a meter 26. The scale of meter 26; i.e., the meter face; may be changed in accordance with the system being simulated. Additional outputs are provided in the form of a plurality of counters located on the instructor's panel 24. These counters operate under control of the program model and may provide an indication of elapsed time and the number of tests or questions performed or answered by the student through the depression of switches on panel 16. In the case of the simulation of a piece of apparatus, a third program controlled counter may be employed to record the number of simulated component replacements ordered by the student in an effort to rectify the programmed malfunction.

In order to change trainer 10 from one program model to another, the student panel is replaced as appropriate, a new slide tray 12 loaded on projector 14 and a new program model loaded into the memory of computer 20. In the manner to be described in more detail below, the action of turning on a main power switch located on instructor's panel 24 applies power to the trainer, clears the computer control logic and initiates a load sequence of the tape program into the memory.

Figure 3:
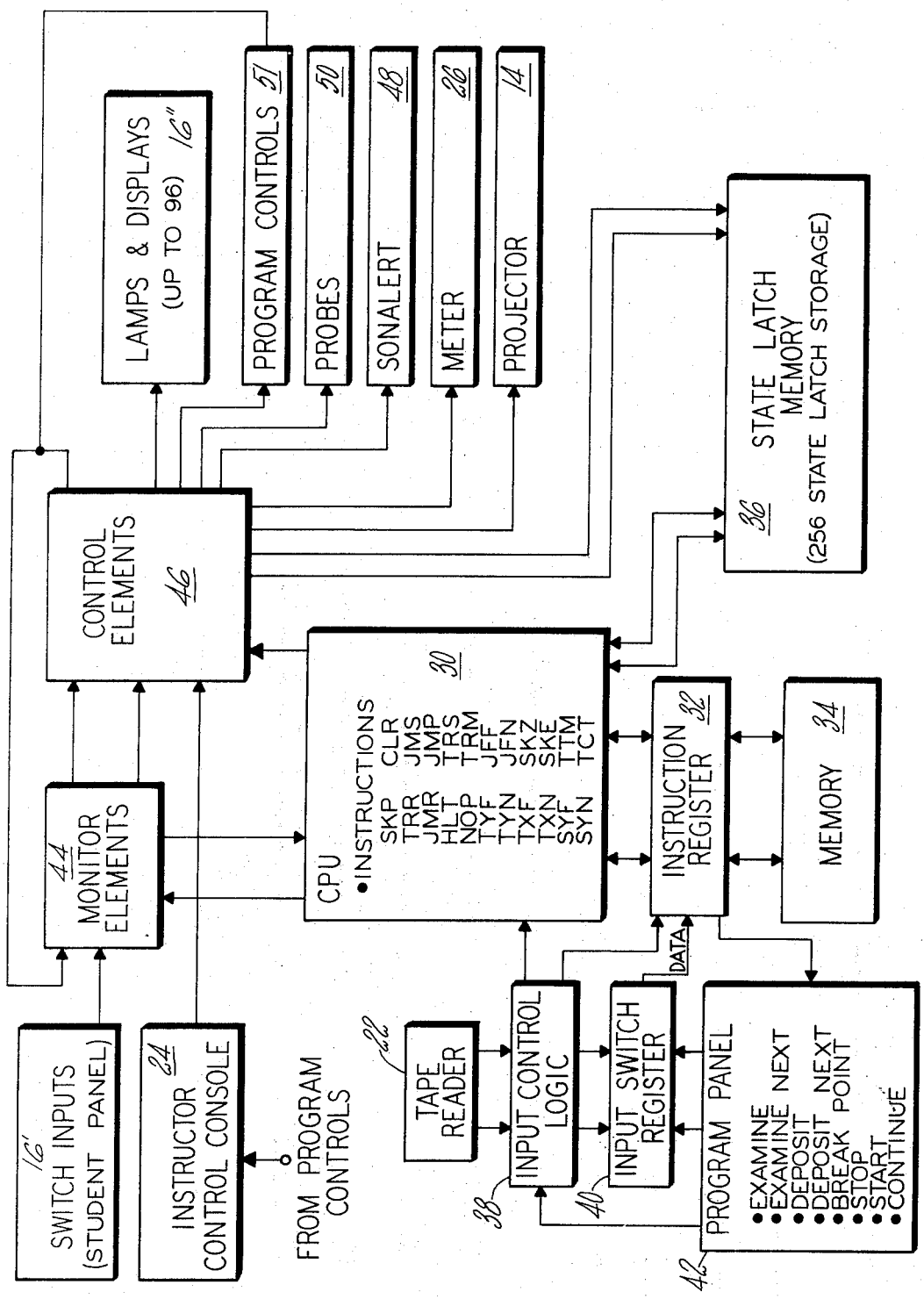
FIG. 3 is a functional block diagram of the preferred embodiment of a trainer in accordance with the invention.

With reference now to FIG. 3, a block diagram depicting the major components of trainer 10 is shown. The computer 20 has the capability of recognizing nine commands, the commands being as follows:

SYN (turn on device associated with Y address portion of command)
SYF (turn off device associated with Y address portion of command)
TXN (test input associated with X address portion of command and set flag if on)
TXF (test input associated with X address portion of command and set flag if off)
SKP (skip or jump over next instruction)
JFN (jump if control flag on)
JFF (jump if control flag off)
CLR (clear)
JMP (unconditional jump)

The computer 20 includes a logic section 30, an instruction register 32, a primary memory 34 and a state latch memory 36. Memory 34, in a preferred embodiment, comprises a serial, shift register memory having a capacity of 4,096 12-bit words. As noted above, the memory is loaded from a magnetic tape via a tape reader 22 located in instructor's panel 24. The program model from the tape is routed through the computer's input control logic 38 into instruction register 32 via an input switch register 40.

A second means of entering data into memory 34 is through a programmer panel 42; programmer panel 42 being employed only in program modification and development and in trouble-shooting of the computer system. Panel 42 has the capability of examining the contents of any specified location in memory 34, examining the next location, depositing data into any given location, depositing data into the next location, setting a break-point in the program, stopping the operation of the computer logic or central processing unit, starting the operation of the central processing unit and continuing the operating of the central processing unit.

Figure 2:
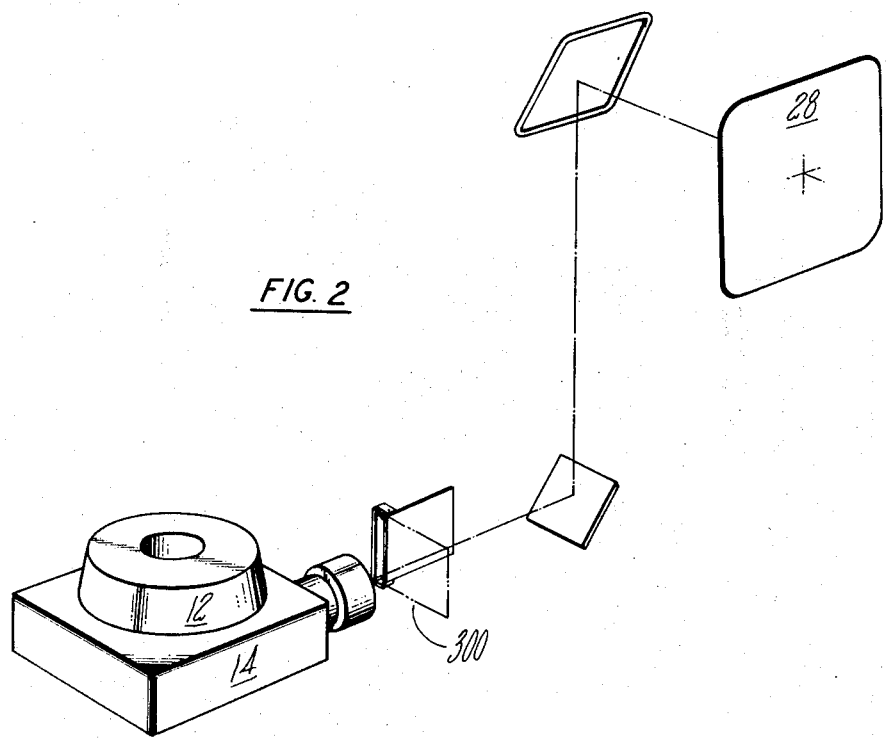
FIG. 2 is a schematic illustration of the mechanical components of a projector system which may comprise part of the apparatus of FIG. 1.

The logic unit 30 of computer 20 controls two major computer subsystems associated with the student panel 16; panel 16 being indicated in FIG. 2 by separate subassemblies 16' and 16'' respectively representing the panel switch inputs and panel output lamps or other display devices such as motor driven active displays. The computer subsystems associated with the student panel comprise a plurality of monitoring elements 44 and a plurality of control elements 46. The monitoring elements 44 will comprise a plurality of AND gates. The monitoring elements 44 provide the computer central processing unit with the capability of selecting a specified input from the student panel. As will be described in more detail below, the monitoring elements 44 are also utilized as an input path from certain of the control elements 46.

The control elements 46, operating under command of the central processing unit, provide both storage capability and drive capability to implement the activation of student display panel 16'' lamps and other display devices, relays and various other types of output devices. As will also be described in greater detail below, the control elements will comprise silicon controlled rectifiers or equivalent devices capable of providing the requisite display device drive current while having a storage capability. The control elements subassembly 46 also includes a number of latch circuits, typically 8-bit storage registers, for the purpose to be described below. The output devices operating under supervision of control elements 46, in the preferred embodiment, consist of lamps and other displays 16'', a plurality of outputs used to control the movement of meter 26, a plurality of outputs used to selectively control the projector 14, an output for a sonalert 48, a plurality of probe outputs 50 and a plurality of program control output signals. The inputs to the control elements 46 comprise selected outputs from the monitor elements 44, a keyboard activated output of the instructor's control panel 24 and, of course, the control output from the logic unit 30 of computer 20. The keyboard inputs to control elements 46, in cooperation with the stored program model, enable the computer to simulate malfunctions from a plurality of stored instructions as selected by the instructor.

Figure 4:
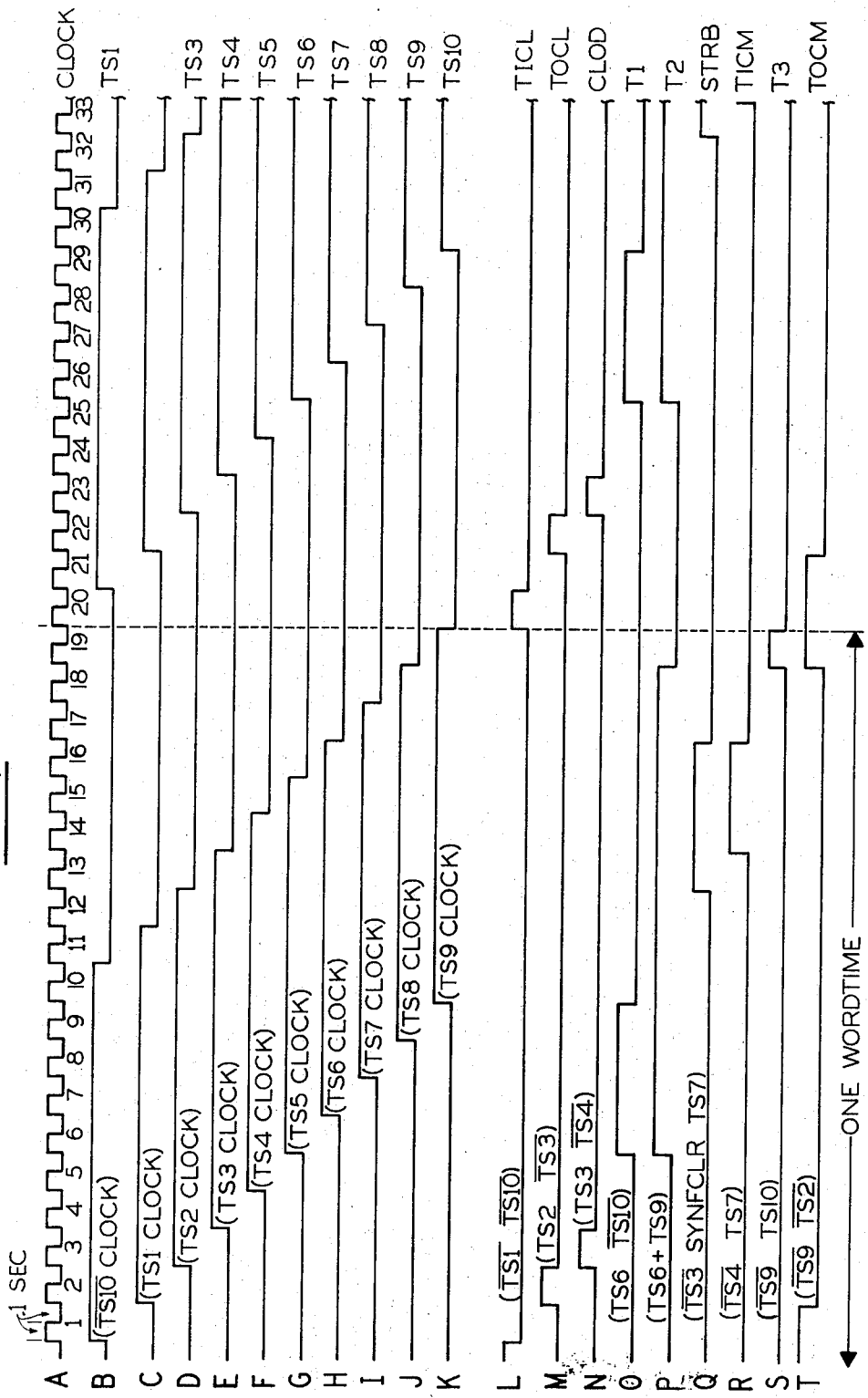
FIG. 4 is a timing diagram representing the output of a timing state generator which comprises part of the control processing unit of the preferred embodiment of the invention.

Before describing the operation of the invention in more detail, it should be noted that the functioning of the computer 20 is based upon operation upon unique addresses in memory 34 in a sequential manner in order to implement a boolean algebra equation-type function. The results of a given sequence of commands is observed by the state of a single memory element in the processor. This element is known as the "flag" flop. The TXN and TXF commands are utilized to test the state of the functions assigned to specific memory addresses; the addresses being specified by bits four through eleven of each twelve bit command word. Bit three of the command word in TXF, TXN, SYF, SYN, JFN and JFF states is used to specify an "on" or "off" condition. For a further understanding of the invention, reference may be jointly had to the description to follow in conjunction with FIGS. 4, 5 and 6 which respectively are a timing diagram, command sequence chart and memory address assignment chart.

Referring to FIG. 7A, the logic circuitry 30 of the computer 20 includes a clock 52, including a crystal controlled oscillator, which provides output pulses to a timing state generator 54. Timing state generator 54, in a preferred embodiment, comprises a ten stage Johnson shift register and associated logic circuitry required to generate the initial control levels and timing pulses depicted in FIG. 4. Upon the initial application of power to the trainer the shift register 54 is reset to zero; an RC network generating a low level reset signal upon the closing of the main on-off power switch. At the end of the period as established by the time constant of the RC network, the reset inputs sense a constant high voltage thus inhibiting any further resetting of the register until power is turned off and then turned on again. The clock oscillator provides, through a conventional inverter, a square wave which is applied as the clock input to each stage of shift register 54. Since all stages of shift register 54 are initially reset, output $\overline{TS10}$ is high. The $\overline{TS10}$ output of the shift register is applied as the data input to the first stage of the shift register and, therefore, the first clock pulse will set the TS1 (first stage) flip-flop to its high state and, in like manner, each consecutive clock pulse will pass the high from a lower to higher stage of shift register 54 until the flip-flops TS1 through TS10 are all set high whereupon the $\overline{TS10}$ output of the circuit becomes low. The switching of flip-flop 10 is, as noted, sensed by the data input of the TS1 flip-flop and, upon the application of the next positive going clock pulse edge to flip-flop TS1, this circuit will be reset to its low level. This action will proceed with succeeding positive going clock pulses passing the low from TS1 through TS10. This cycle will be repetitive until power is removed from the system.

Accordingly, by using combinations of Q and $\overline{Q}$ outputs from shift register 54, the requisite timing signal orders are generated from the register combinations of high and low. These level combinations are used, in the manner to be described below, for computer timing and control. The following tabulation identifies the timing generator signal functions by name, timing and function:

TABLE I

| Name | Generated | Function |
|---|---|---|
| TICL (Timing Input Clock Logic) | When all states are reset, which is 1st clock time of a word time | Step memory counter. Also performs additional clocking to other logic functions |
| CLOD (Clock Output Data) | 4th clock of a word time | Clocks memory output data into instruction register |
| STRB (Strobe) | 13th through 16th clocks of a word time | Strobes data into memory, state latches & 8-bit addressable output register |
| TOCL (Timing Output Clock Logic) | Third clock of a word time | Clocks results of memory counter — program counter comparison into match flop. Also performs additional clocking to other logic functions |

TABLE I — Continued

| Name | Generated | Function |
|---|---|---|
| TICM (Timing Input Clock Memory) | 14th through 16th clocks of a word time | Clocks data from tape to memory and is one of 2 clocks necessary for memory data recirculation |
| TOCM (Timing Output Clock Memory) | Last clock of one word time and overlaps first 2 clocks of next word time | 2nd clock for memory refresh cycle |
| T1 | 6th through 9th clocks of a word time | Timing level increments PC during skip |
| T2 | 6th through 19th clocks of a word time | Command decoding timing |
| T3 | Last clock of a word time | Increment program counter and clock TEST flop |

Figure 7C:
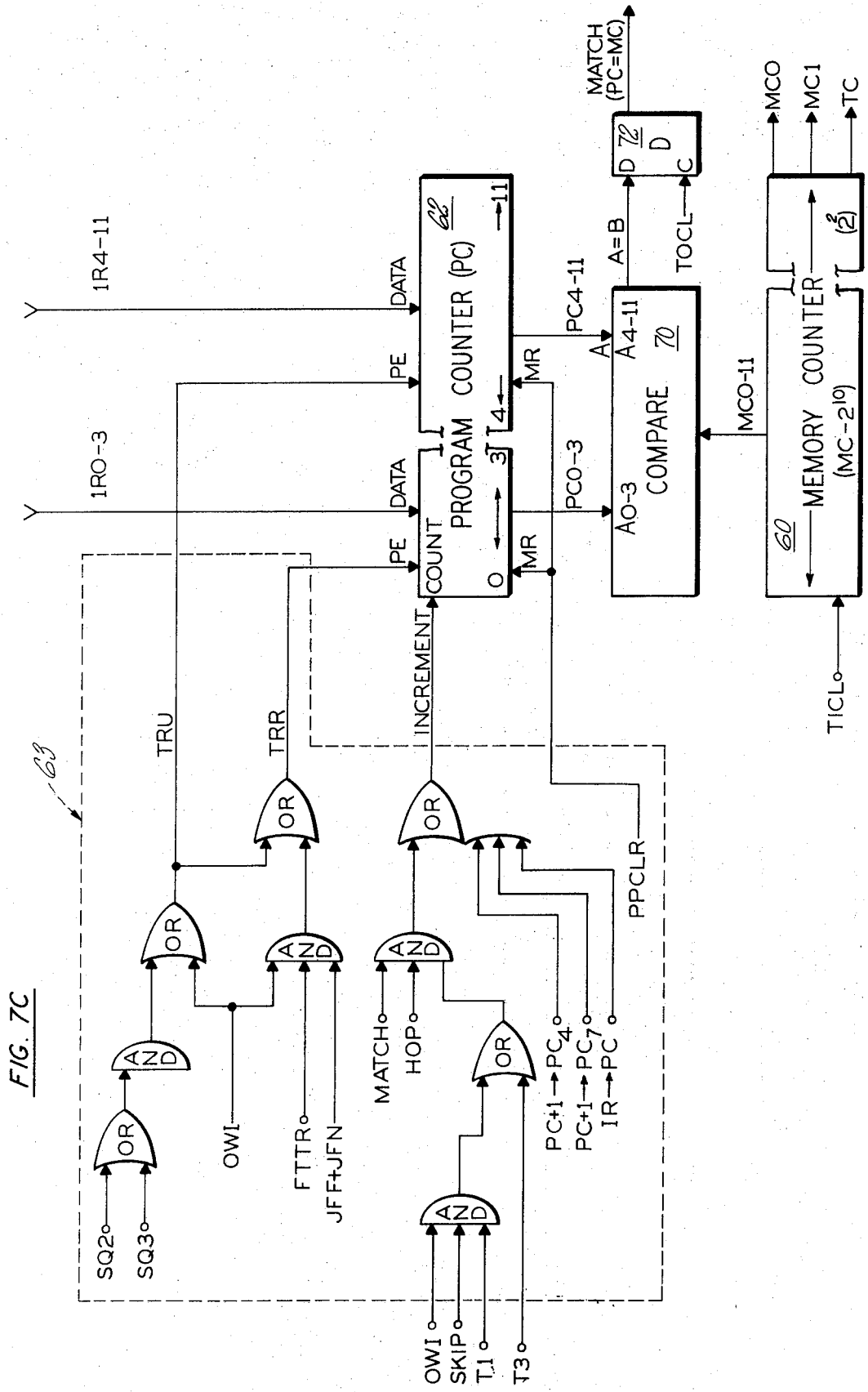
FIG. 7C is a block diagram of a further portion of the computer.
Figure 7D:
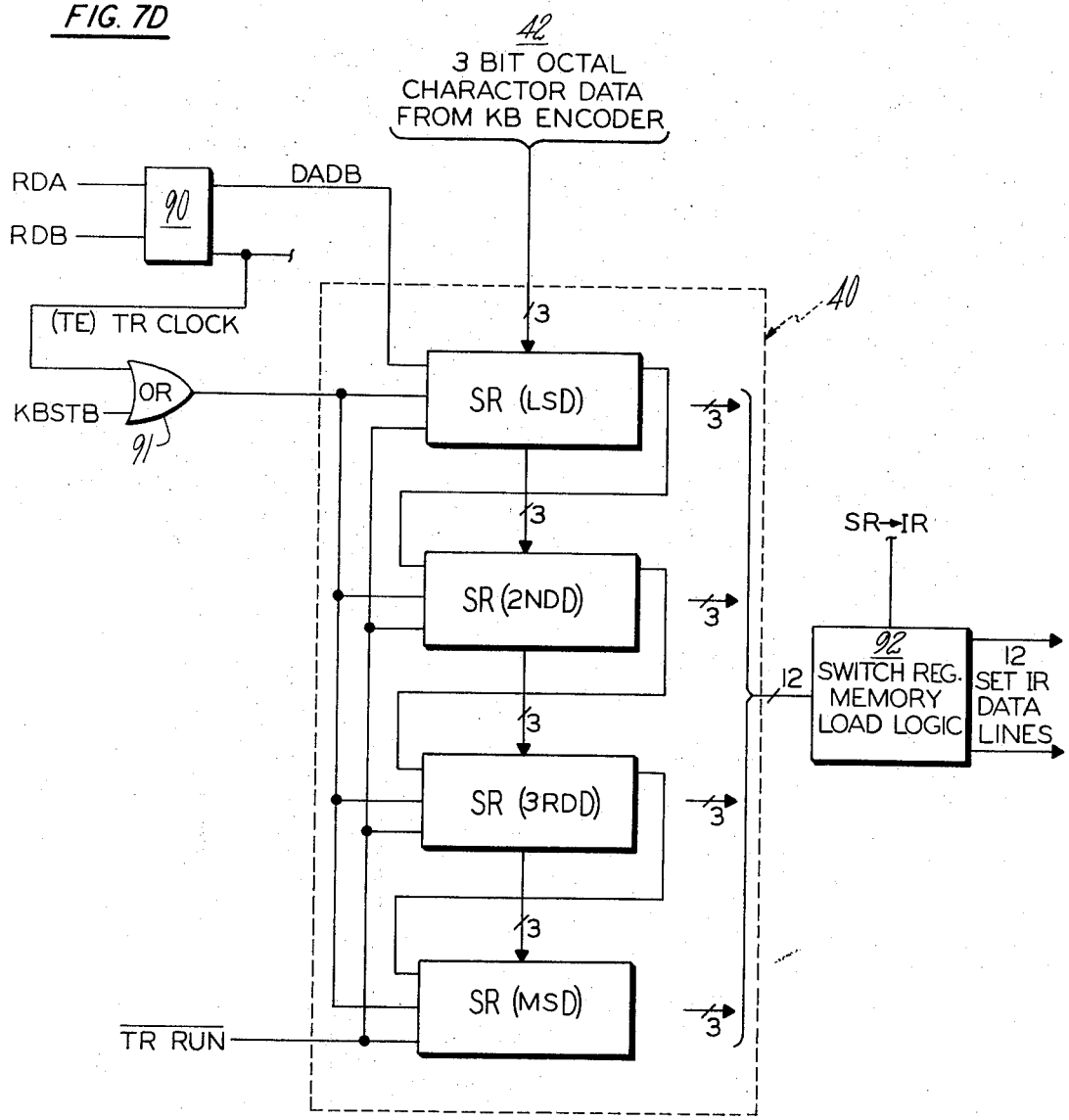
FIG. 7D is a block diagram of the switch register of the computer of FIG. 3.
Figure 7E:
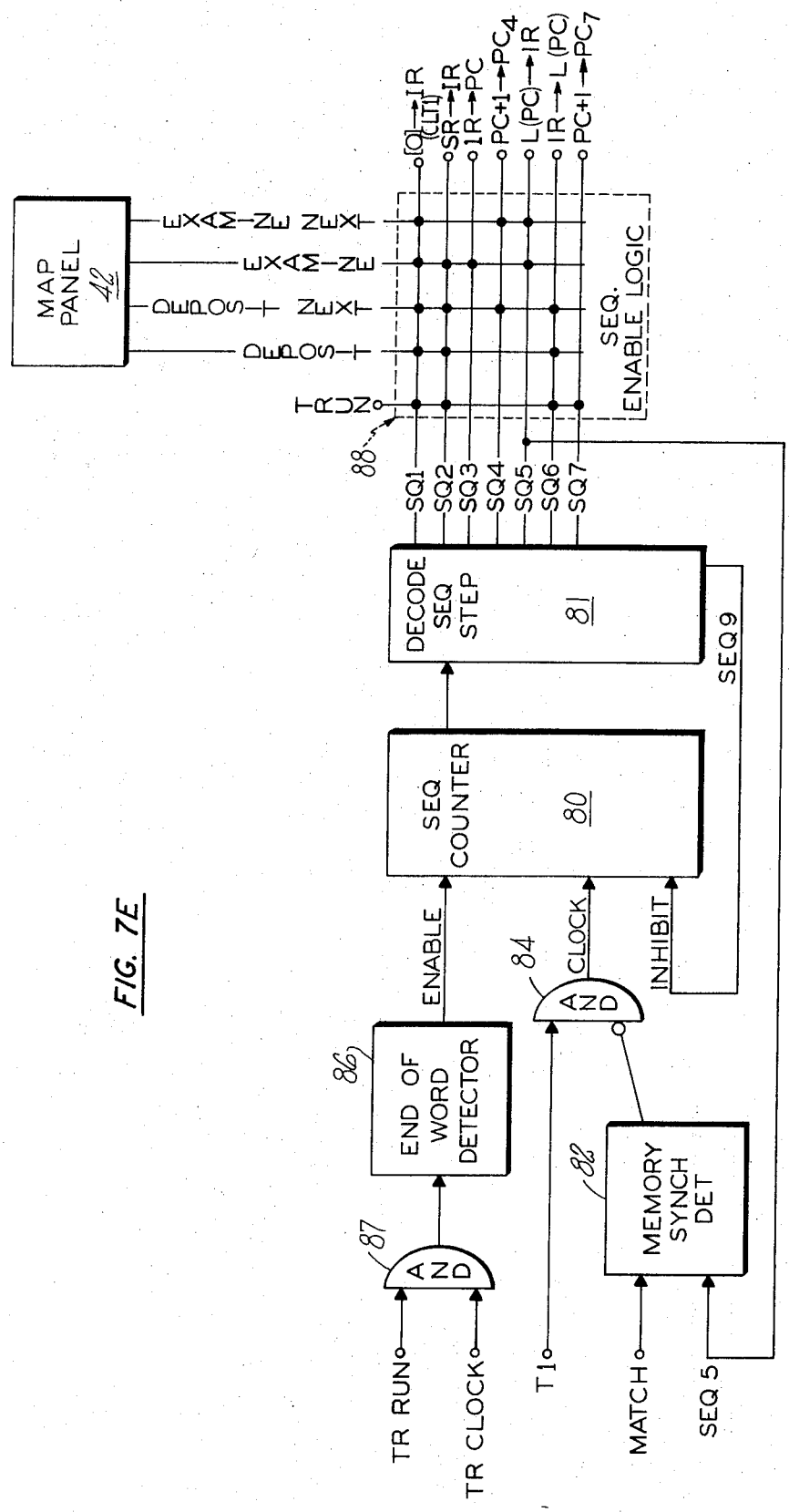
FIG. 7E is a block diagram of the sequencer logic of the computer of the preferred embodiment of the invention.

As noted above, memory 34 is a serial, shift register memory which has, associated therewith, a data transfer or instruction register 32. In accordance with the operation of the present invention there are three memory cycles; these cycles being the read, write and memory data retention operational modes. The write cycle will only occur during the time the memory is initially loaded with a program model. During the write cycle data is read from the magnetic tape by tape reader 22 and is parallel-transferred into instruction register 32 under the control of a sequencer (FIG. 7E). After each word has been transferred into instruction register 32 a write signal IR-L(PC) will, through the action of a trailing edge detector 56, set the "write" flip-flop 58. With reference jointly to FIGS. 7B & 7C, the write flip-flop 58, in conjunction with a memory counter 60, will enable memory 34 whereby the memory will accept the new data word from instruction register 32; the memory counter addressing the proper memory location. After write-in has occured, the write flop 58 is reset by TOCL at the end of each word time. Flop 58 may also be cleared by the CLR I/O signal provided by an operations decoder as explained below. Once reset flop 58 will disable the memory input until the next word is transferred into instruction register 32 and prepared for writing into memory 34. The memory load cycle will be described in further detail below.

Memory data retention is controlled by the TICM and TOCM timing pulses provided by timing state generator 54 in the manner indicated by Table I above. These timing pulses are applied to clock drivers 59, which may comprise buffer amplifiers, and via the clock drivers to each of the plurality of packages which comprise the memory. In a preferred embodiment of the invention the memory comprised 48 separate 1023 bit shift register subassemblies or packages interconnected to define four 1024 twelve bit word memory banks. The TICM pulse causes the next word to be strobed to the package internal holding logic. Thereafter, the TOCM pulse causes the holding logic to transfer the selected word back into the recirculating path thus refreshing the data contained within the recirculating package. Since the TICM-TOCM timing pulse generation is a reoccurring cycle, each word time one word from one of the four 1024 word memory banks is present at the output pins of the packages. This word is recirculated continuously until either a read or write cycle occurs.

A read cycle will be initiated at the end of a word time preceding a MATCH word time with the TICM and TOCM timing pulses clocking the data word to be strobed out during the next MATCH word time. The significance of and manner of generating a MATCH signal will be described below. For the present it should be sufficient to note that, following memory clock, MATCH word time is determined and signal generated which enables the instruction register 32 to receive the new data word from the memory. Thereafter the instruction register data is available for further computer operations.

As noted above, the revolution of data in memory 34 is serial and in blocks of words. It is necessary, therefore, to be able to identify each word in the memory as it is presented for outputing from the memory address indicated by memory counter 60. It is also necessary to determine if the word identified in the memory is the precise word on which it is desired to operate as indicated by a program counter 62. The act of identifying a precise word in the memory as the word which should be the next word operated on is called MATCH; MATCH defining a matching count condition between program counter 62 and memory counter 60. The word time during which the MATCH occurs is defined as the MATCH word time.

The read and write cycles will now be described in more detail. Understanding of the operation of the trainer will be facilitated through reference to Table I above and by bearing in mind that each word time, as established by timing state generator 54 and indicated in FIGS. 4 and 5, will contain twenty "clock times". During the read cycle, the TICM pulse, ocurring at clock time 14, and the TOCM pulse, occurring at clock time 19, strobe the memory packages and thereby present the selected data at an output pin of each memory package. During clock times 20, 21 and 22 program counter 62 and memory counter 60 are incremented and compared; the memory counter being incremented by the lead edge of the TICL clock pulse. The program counter is under control of the computer logic; i.e., the algorithm of the command function. The program counter control circuitry is indicated schematically at 63 in FIG. 7C and the operation of this logic circuitry will be obvious to those skilled in the art by reference jointly to FIGS. 7 and 5. Program counter 62 is a binary counter that can be parallel loaded and incremented.

The binary numbers in counters 60 and 62 are compared in a comparator 70 and the results of the comparison; i.e., the state of the comparator 70, is looked at at every TOCL time, by a delay element 72. Delay or storage element 72 provides a MATCH output logic level.

Signals commensurate with the two most significant bits of memory counter 60, the MC0 and MC1 signals, are applied to the selector portion of memory 34 and enable the appropriate block of memory which contains the word to be loaded into the instruction register 32 during MATCH time. The equal program/memory counter comparison generates, in the manner described briefly above, the MATCH condition signal at clock time 23. Also at clock time 23, the CLOD signal (see Table I) is generated and applied to AND gate 64. The MATCH signal and either a run or one word instruction signal are also applied as inputs to gate 64 and the output of gate 64 is applied as an input to OR gate 66. The second input to gate 66 is a memory synchronization signal provided in the manner to be described below. The output of gate 64 and the L(PC)-IR synchronization signal are applied to gate 66 which will generate a CW2 signal for transferring data associated with the selected memory address into instruction register 32. Thus, at clock time 23 the instruction register contains the desired data word. This data word will be present in instruction register 32 until the next load or CW2 pulse is generated causing new data to be loaded into the instruction register.

Considering the write cycle in more detail, when the end of a word time is detected, a high CLT1 signal is generated by the sequencer. This CLT1 signal is inverted and, as noted above, employed as the reset input to instruction register 32. Upon resetting of instruction register 32, the contents of the switch register 40 (FIG. 3) are transferred to instruction register 32 and entered therein in parallel fashion. The switch register 40 will be described below in the discussion of FIG. 7D.

The input from the switch register to instruction register 32 is indicated at SIRO-11 in FIG. 7B. Prior to the transfer of the contents of the switch register into the instruction register, the contents of the memory and program counters are compared to determine MATCH time. When the comparison is generated MATCH occurs and, in the manner to be described below in the discussions of the sequencer (FIG. 7E), a high IR-L(PC) synchronization signal is provided. This IR-L(PC) signal caused the write flop 58 to be set at the TOCL time of the MATCH word time as described above. The MC0 and MC1 signals provided at the outputs of memory counter 60 are, as previously noted, applied to a selector portion of memory 34 and enable the appropriate set of memory packages during MATCH word time. The output of the write flip-flop 58 is applied to the memory packages completing signal application to the packages and causing the contents of instruction register 32 to be written into the proper memory location. As previously noted, the write flip-flop 58 will then be reset at the next TOCL time following MATCH word time; i.e. upon generation of the TOCL signal; thus ending the write cycle.

As noted, in the preferred embodiment the program model is loaded into memory 34 from magnetic tape.

The required signals for the operation of tape reader 22 are RUN, REVERSE and FAST (see FIG. 8). The tape deck may, for example, comprise an International Computer Products Model 100 which provides two data channels and signals commensurate "end of tape", "deck status" and "read or write permit". The RUN signal enables the tape reader and allows the tape to rotate for entry of data. The REVERSE signal defines the direction of tape motion. The FAST signal activates the tape in a fast rewind mode or a normal entry mode. The normal entry sequence is run mode, reverse, and fast. these sequences are activated through a shift register that is either reset or loaded and, after load, is sequenced through a counter. The master reset on this register, when activated, causes the system to come up in a run mode reverse and fast or, in other words, a rewind sequence. This master reset is activated by the tape deck status signal provided when a tape is properly installed. When power first comes on, the power supply clear signal, assuming that deck status is qualified, will cause the register to be reset. Upon reseting the register causes the proper signals to occur such that the tape reader will rewind or attempt to rewind the tape. When the tape is fully rewound; i.e., upon occurance of the "end of tape" signal; and after the power supply clear signal has decayed, the T1 timing signal from the processor inputs data from the parallel inputs to the controlling register thereby switching the tape deck control signals from reverse to forward motion and from fast to normal speed. At this time the tape motion is assured and shortly thereafter data and clocks begin coming out of the two channels associated with the logic from the tape reader.

The RDA and RDB signal from the tape reader are delivered to the input control logic 38. The input control logic comprises the sequencer, the tape reader control logic, which was briefly discussed above, and a tape data and clock decoder 90 (see FIG. 7D). The tape data and clock decoder 90 comprises a plurality of AND gates and, connected to the outputs of the AND gates, an OR gate and a flip-flop. The OR'ed function of the two input data channels provides a clock for input word timing and "end of record" and "end of word" control. The flip-flop is set and reset by respective data channels thus providing a serial data stream.

The serial data and timing signal from decoder 90 are clocked serially into switch register 40. As may be seen from FIG. 7D, register 40 comprises a four stage 12 bit serial shift register. Data is shifted into this shift register until the end of word is detected by the sequencer. Upon detection of the end of a word, a SR – IR control signal provided by the sequencer enables twelve AND gates in the switch register-memory load logic 92 and the data "ones" will qualify the set input of the associated stages of instruction register 32.

It is to be noted that switch register 40 has the capability of both serial and parallel entry. Accordingly, data may be entered either from tape or from an auxiliary programmers panel with a minimum of logic circuitry employed; the programmers panel utilizing octal characters.

With reference now to FIG. 7E, the operation of the sequencer portion of the logic circuitry of the computer 20 will be described. The sequencer logic performs the synchronizing function between the tape reader logic, external control switches such as those on a programmers panel (FIG. 3) and the internal computer logic, and particularly the MATCH circuitry, when power is initially applied to the trainer. The MATCH circuitry synchronizes two asynchronous systems; the externally clocked input data and the internal control. Upon application of power the sequencer will assume a state which is dependent upon inherent characteristics of sequence counter 80. Counter 80, in the preferred embodiment, comprise a four stage binary counter which is decoded by a one-of-ten decoder 81. Regardless of which state counter 80 assumes, however, the counter will receive a clock input T1 from timing state generator 54 which will cause incrementation until sequence 5 (SEQ 5) time. The MATCH output from comparison circuit 70 as passed by MATCH flop 72 is applied as a first input to a memory sync. detector 82 which comprises a logic circuit comprising a pair of AND gates driving an OR gate. The SEQ 5 output from the sequencer is also applied to detector 82 and, if there is no MATCH condition, detector 82 will disable gate 84 thereby blocking the clock signals from sequence counter 80 when SEQ 5 is qualified. Thus, if there is no MATCH condition at sequence (SEQ5) time, the sequencer will be inhibited from further count until the internal logic obtains a MATCH. When a MATCH is obtained the sequencer will recognize the MATCH condition, the disabling signal will be removed from gate 84 thus allowing the sequencer to begin counting sequence times again and thereby completing an input data word transfer, in the manner to be described in more detail below, or the external control switch operation. Restated, the sequencer will recognize the MATCH condition and, upon its occurance, will be synchronized to the computer internal logic. At the completion of a data word transfer or control switch operation, the sequencer will count to sequence 9 (SEQ9) time and stop until it is enabled again by detection of another word by an end of word detector 86.

To consider the above briefly described operation in more detail, when power is applied to the trainer, the sequence counter 80 will assume some count. For the purposes of this description, it may be assumed that sequence counter 80 assumes a count of 4. The counter will then count to 5 and pause until a MATCH is qualified. The count is then advanced to SEQ9 by the T1 clock signals. At SEQ9, further advance of counter 80 is inhibited until the counter is enabled by detector 86.

The sequencer will stay in the SEQ9 condition, corresponding to the end of one sequence cycle, until an indication is received from the tape reader logic that another word is ready to be loaded into memory 34 or until a programmers panel control switch is depressed. Word gaps, signifying the end of each input data word, are detected by the end-of-word detector 86 which comprises a retriggerable single shot multivibrator. The detector 86 provides an enable pulse which resets sequence counter 80 to zero. This results in SEQ0 being decoded and SEQ5 and SEQ9 being reset thereby allowing the sequencer to count clocks at T1 time up to SEQ5. Thereupon the sequencer will look for a MATCH, obtain it, count to SEQ9 and stop and wait for the next external operation to trigger the enable signal and initiate another sequence.

The outputs of sequence decoder 81 are applied to sequencer enabling logic 88. Logic circuit 88 comprises a plurality of AND and OR gates suitably interconnected to provide, from the decoder 81 and a tape run signal, timed outputs commensurate with the controlling functions for loading data into memory as shown in FIGS. 7C and 7E.

After a tape has been loaded into memory 34, a RUN signal is generated by an end-of-record detector. The end-of-record detector comprises a detector circuit 96 set-reset flip-flop 97 which receives a LOGO (good load) signal from the tape deck control logic and the power supply initiate PPCL signal and a further gate 98. The RUN signal is applied as a control signal for instruction register control gate 64.

When the RUN signal appears, the program and memory counters will initially be at zero and a MATCH condition will be obtained. The instruction word from location zero in memory 34 will be loaded into instruction register 32. With reference to FIG. 7F, the state of the instruction register will be examined by operations and address decoders. The operations decoder comprises a one-of-eight decoder 100, a combinational logic circuit 102 which decodes a unique bit group combination and a one word control flip-flop 104 which detects the presence of a two word instruction. Decoder 100 only looks at the first three bits of the instruction and generates processor internal control signals for application to the flag flop and program counter control logic. The combinational logic circuit, which will perform an ANDing function, generates a SKIP signal for program counter 62 which causes the counter to increment at T1 time. Logic circuit 102 also performs a second ANDing function, to generate a CLR I/O clearing signal.

As will be apparent from simultaneous reference to FIGS. 6 and 7F, the address decoder comprises three decoding stages which define, based on the states of instruction register bits 3–11, one of 256 unique addresses that are routed to the flag flop and utilized to select a monitor element or turn on a control element. The address decoder comprises a pair of one-of-four decoders 106 and 108 and a group of four AND gates 110. Decoders 106 and 108 are qualified by the RUN signal from run control flip-flop 97 and the one word instruction (OWI) signal from the operation's decoder. Control signals for address decoder subassemblies 106 and 108 and for decoder subassembly 110 are thus derived, via respective input AND gates 112 and 114, respectively from operations decoder subassemblies 100 and 104.

Referring to FIGS. 3 and 7F, the monitor elements 44 are associated into two groups and the outputs of the AND gates of each group are bussed together as the RETO and RETI inputs to the flag logic circuit. One monitor gate of each group will be selected by the outputs of the address decoder as further decoded (combined) in a pair of one-of-sixteen decoders 116 and 118. One of the two selected monitor gate output signals will, in turn, be selected by a gate combination consisting of AND gates 150 and 152 which have their outputs OR'd in gate 154. The control inputs to gates 150 and 152 is the seven bit of instruction register 32. The output selected by gate 154 is applied to a comparison circuit 156 which performs the complement of an exclusive OR with instruction register bit three to provide a first input signal to the flag flop 158. The data from the sampling performed by circuit 156 is clocked into the flag flop 158 at time T3 if the flag flop has been turned off by gate 160.

The output provided by flag flop 158 indicates whether the program should be followed in sequence or follow a command from the operations decoder. The state of flag flop 158 is applied as a first input to logic circuit 162 which is identical to logic circuit 156. Circuit 156 is also connected to instruction register 32 bit 3. The output of circuit 156 controls the loading of bits 4 – 11 from the instruction register into the program counter. This data transfer, when performed, changes the contents of the program counter relative to the memory counter.

Referring again to FIG. 8, the instructors panel 24 contains a number of input devices in addition to tape reader 22. These inputs include a keyboard 170 for entry of malfunctions. Malfunctions are entered by keying, into 4-bit registers 172 and 174, a number associated with a malfunction; the equation commensurate with the selected malfunction being previously loaded into the memory 34 from tape. The keyboard number is encoded by encoder 176 and, through the action of a delay device 178, stable data is transferred into registers 172 and 174. A numeric display 180 provides an indication of the selected malfunction and a BCD to binary encoder 182 converts the binary coded decimal to a control element malfunction register address identification. The selected register bit associated with this address is set by depression of an "enter" key. The malfunction can be cleared by resetting the malfunction register with a clear key.

The instructors panel also includes a plurality of counters and associated display devices. These counters include an elapsed time counter 200 and display 202 operated from the power supply via a pulse generator 204 and controllable divider 206. The counting of time may be halted, under program control, by timer enable or reset signals. A test counter 208 and display 210, also under program control, may indicate the number of tests performed by the student. Similarly, the replace counter 212 and display 214 may indicate the number of component replacements made by a student.

As noted above, control elements 46 include 25 bits of storage associated with possible abnormalities or malfunctions. These 25 bits of storage are comprised of three 8-bit latches and one additional storage element. When the instructor calls for a malfunction, one of these 25 bits is looked at through monitor elements for any given instruction. Through implementation of the conditional transfer function via operation of the flag flop circuit, as described above, the existence of a malfunction is detected and the appropriate stored equations in the program model solved.

Considering again FIGS. 3 and 6, the state latch memory 36 comprises a 256-bit random access memory. Thus, by way of example, memory 36 may comprise an Intel type 1101A RAM. Memory 36 provides a simulated sub-routine capability. Stages of memory 36 are tested on or off under control of commands associated with specific addresses in memory 34. The outputs of state latch memory 36 are bussed together and applied to the flag flop logic circuit in the same manner as the monitor elements.

Five additional 8-bit registers or latches of control element subassembly 46 provide the programmer with access to the outside world. These latches are associated with program controls 51, probes 50, Sonalert 48, meter 46 and projector 14. The latches associated with the probes, typically eleven in number, pull a conductor available to the student panel to ground when addressed. The latch associated with the Sonalert, which is a noisemaker, through a driver provides an energizing signal for audible warning purposes when addressed by a SYN command. All latches in the control element subassembly are, of course, set by a SYN command and remain latched until turned off by an SYF command.

The meter circuitry employs seven latches for producing a binary digital number. This binary number is converted into an analog voltage by a Zeltex ZD430 D/A converter. The analog voltage is applied directly to the meter 26.

The student panel lamp enable circuit employs an SCR control. Each lamp has an SCR associated therewith and the low voltage side of each lamp goes to ground through normally closed transistor switches which comprise the SCR control. While each SCR; i.e., each panel lamp or other display has a unique address, extinguishing the on lamps is accomplished via a single common latch having a unique address. Lamp turn off is accomplished by opening the path to ground whereby the SCR's self-extinguish.

The computer 20 may also include a low frequency oscillator as part of program controls 51. This oscillator, physically located in the control subassembly for convenience, also has a unique address. The output of the oscillator is routed through a monitor element in subassembly thereby allowing the program to observe the state of the oscillator. This enables the computer to provide cyclic visual or audible functions.

As with the above-described low frequency oscillator, the program controls may also be provided with a delay function. The delay function is accomplished with a single shot multivibrator settable by a SYN command associated with its unique address. The output of the delay is also routed through a monitor element thereby allowing the programmer to initiate a delay function.

The two most significant state latch address lines are derived from latches in the control element subassembly. As noted above, the state latch memory is divided into four pages. These two lines specify which page is available for addressing through the central processing unit 30.

Considering now the projector control, twenty latches in control element subassembly 46 are employed to define the number of the picture to be displayed on screen 28. These latches will be turned on in pairs by the solution to appropriate projector equations in the program model. The on latches are applied to separate priority encoders that respectively generate the units and tens places of a binary number associated with the particular combination of latches. At the end of each active pass; i.e., when the memory counter has reached its terminal count; an initiate signal is generated causing the projector to seek the selected picture. Restated, the TC output from counter 60 (FIG. 7C) in conjunction with the ANDing of the group select outputs of the priority encoders generates a high level initiating signal for the projector. This signal causes the projector to seek the selected picture; the projector being a standard commercial model having internal comparison circuitry. The projector also includes an internal holding circuit which holds up the initiate line until the desired picture location has been indexed.

Referring back to FIG. 2, the projection system includes a wink shutter 300. When a picture has been selected it will stay on until a new picture is selected. Accordingly, means must be provided to prevent viewing of the last picture displayed if the slide selection equations are not satisfied. The wink shutter 300 accomplishes this purpose. Shutter 300 is normally closed and is opened any time the program model projector equations are qualified. Energization of the solenoid of shutter 300 is through a driver amplifier which supplies a ground for the solenoid; the amplifier being turned on by the ANDing of the group selects of the two priority encoders.

Presuming that the trainer has been programmed by loading of the taped program model into memory 34 and installation of the speciallized student panel 16, the memory will be scanned, the appropriate equations as determined by the program model will be solved and an initial display presented to the student. The student can manipulate the various control functions as represented by the manual actuators on the display and observe the performance of the system on the meter 26, screen 28, panel lamps and displays and an audible warning (Sonalert 48). Each student reaction is evaluated through the program model equations and the appropriate response displayed. During power on, the equations within memory 34 are continually scanned serially under control of the equations themselves.

If the instructor enters a malfunction, different results are obtained through evaluation of the equations and different branch paths are taken in the program which determine the malfunction indication to be displayed. Generally the program is designed to energize counter 200 when a malfunction is entered. The counter 208 and 212 are activated in response to the solving of equations commensurate with the students response.

While a preferred embodiment has been shown and described various modifications and substitutions may be made thereto without departing from the spirit and scope of the invention.

Accordingly, it is to be understood that the invention has been described by way of illustration and not limitation.

What is claimed is:

1. A universal trainer comprising:
   a magnetic tape with electrical signals disposed thereon,
   magnetic tape reader means to read said magnetic tape, said tape reader means providing electrical signals corresponding to recorded instructions which define a plurality of equations commensurate with a program model;
   means for storing information corresponding to an entire program model, said storing means having terminals at which signals corresponding to individual instructions may be presented;
   means connected to said tape reader means and said storing means for transferring the instructions corresponding to an entire program model into and reading individual instructions out of said storing means, said transferring means including an instruction register for generating logic voltage levels for implementing command algorithms corresponding to individual of the instructions which comprise the program model;
   display means, said display means including removable student reaction panel and a graphic representation of the lesson subject on said removable student display-reaction panel, said panel including student operable switches, said display means also including a plurality of display devices, said program model and said panel cooperating to program the trainer to simulate a special lesson;
   clock means for continuously generating a plurality of timing signals;
   means coupling timing signals generated by said clock means to said storing means to cause the recirculation of the entire program model in said storing means whereby the equations which define the program model are continuously evaluated by periodic presentation of individual instructions to said transferring means instruction register at said storing means terminals;
   decoder means connected to said transferring means instruction register and responsive to information commensurate with instructions temporarily present therein in the form of logic voltage levels for generating control signals;
   means connected to said panel means and responsive to said decoder means generated control signals for periodically and individually enabling the switch inputs from said panel means commensurate with the instruction present in said transferring means instruction register;
   means for generating a coded signal commensurate with an abnormal condition represented by a portion of the program model; and
   display control means connected between said means for periodically and individually enabling student input switches and said display means, said display control means being responsive to said decoder means generated control signals and said coded signals for controlling at least a first display device commensurate with a portion of the program model determined by the state of said coded signal generating means, said transferring means instruction register and said panel switches.

2. The apparatus of claim 1 wherein said decoder means includes:
   first decoder means responsive to the logic voltage levels provided by said transferring means instruction register for generating a plurality of command signals; and
   second decoder means responsive to logic voltage levels provided by said transferring means instruction register and to selective of said first decoder means command signals for generating said control signals.

3. The apparatus of claim 2 wherein said storing means comprises:
   a data storage device having terminals at which signals may be presented;
   memory counter means, said memory counter means being responsive to timing signals provided by said clock means;
   means connected to said memory counter means and to said transferring means instruction register for providing a read-out control signal when the instruction presented at the storage device terminals is commensurate with information corresponding to said logic voltage levels; and
   means responsive to said read-out control signals and timing signals for initiating read-out from said storage device into said transferring means instruction register.

4. The apparatus of claim 3 wherein said decoding means further includes:

means responsive to logic voltage levels provided by said transferring means instruction register and to said student operable switches for generating signals commensurate with the results of a sequence of program commands; and means responsive to said signals commensurate with the results of a command sequence and to command signals provided by said first decoder means for controlling the reading of instructions out of said transferring means instruction register into said read-out control signal generating means.

5. The trainer of claim 4 further comprising:

projector means including a student observable screen;

means for loading a plurality of pictures commensurate with the lesson subject into said projector means; and means electrically connecting said projector means with said display control means whereby said pictures may be individually selected and projected on said screen.

6. The trainer of claim 1 further comprising:

projector means including a student observable screen;

means for loading a plurality of pictures commensurate with the lesson subject into said projector means; and means electrically connecting said projector means with said display control means whereby said pictures may be individually selected and projected on said screen.

* * * * *